(12) United States Patent
Jezek

(10) Patent No.: US 11,542,749 B2
(45) Date of Patent: *Jan. 3, 2023

(54) CORING APPARATUS FOR RUBBER STATOR

(71) Applicant: Clean-Tube LLC, Tomball, TX (US)

(72) Inventor: Paul D. Jezek, Houston, TX (US)

(73) Assignee: CLEAN-TUBE LLC, Tomball, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/837,882

(22) Filed: Apr. 1, 2020

(65) Prior Publication Data

US 2020/0291723 A1 Sep. 17, 2020

Related U.S. Application Data

(60) Continuation of application No. 16/171,119, filed on Oct. 25, 2018, now Pat. No. 10,787,860, which is a division of application No. 14/623,814, filed on Feb. 17, 2015, now Pat. No. 10,151,145.

(51) Int. Cl.
*E21B 4/02* (2006.01)
*B23B 41/00* (2006.01)
*F04C 2/107* (2006.01)

(52) U.S. Cl.
CPC ............ *E21B 4/02* (2013.01); *B23B 41/00* (2013.01); *B23B 2226/33* (2013.01); *F04C 2/1071* (2013.01); *F04C 2230/70* (2013.01)

(58) Field of Classification Search
CPC .......... E21B 4/02; E21B 43/11; E21B 29/002; E21B 29/005; B23B 41/00; B23B 2226/33; F04C 2/1071; F04C 2230/70
See application file for complete search history.

(56) References Cited

U.S. PATENT DOCUMENTS

| | | | |
|---|---|---|---|
| 2,291,862 A | 4/1942 | Bailey | |
| 3,004,524 A * | 10/1961 | McCay | F15B 15/225 91/26 |
| 5,423,348 A | 6/1995 | Jezek et al. | |
| 5,975,429 A | 11/1999 | Jezek | |
| 6,126,748 A | 10/2000 | DeHart | |
| 6,263,988 B1 | 7/2001 | Matatof | |
| 6,966,105 B2 | 11/2005 | Tankersley | |

(Continued)

FOREIGN PATENT DOCUMENTS

WO 2012035486 A1 3/2012

*Primary Examiner* — Lee A Holly
(74) *Attorney, Agent, or Firm* — Cabello Hall Zinda, PLLC

(57) ABSTRACT

An apparatus for removing rubber stator material from inside a housing includes a head, at least one blade, and an actuator. For example, the apparatus can be used to core out rubber material from the housing so new material can be molded therein. Also, the apparatus can be used to cut back excess rubber material newly molded in the housing. The head is rotated about an axis and is moved along the axis relative to the housing. The at least one blade is pivotably connected to the head and removes the rubber stator material at least partially from inside the housing with the rotation and movement of the head through the housing. The actuator is associated with the at least one blade and is operable to adjust a pivot of the at least one blade relative to the head.

19 Claims, 13 Drawing Sheets

(56) References Cited

U.S. PATENT DOCUMENTS

| | | | |
|---|---|---|---|
| RE44,403 E | 8/2013 | McKay | |
| 8,777,598 B2 | 7/2014 | Akbari et al. | |
| 10,151,145 B2 * | 12/2018 | Jezek | E21B 4/02 |
| 2004/0045714 A1 * | 3/2004 | McGavern | E21B 29/002 |
| | | | 166/55 |
| 2008/0092356 A1 * | 4/2008 | Fuhst | E21B 29/005 |
| | | | 29/56.5 |
| 2015/0211314 A1 * | 7/2015 | McAfee | E21B 29/00 |
| | | | 166/250.01 |
| 2016/0237812 A1 | 8/2016 | Foucher et al. | |

* cited by examiner

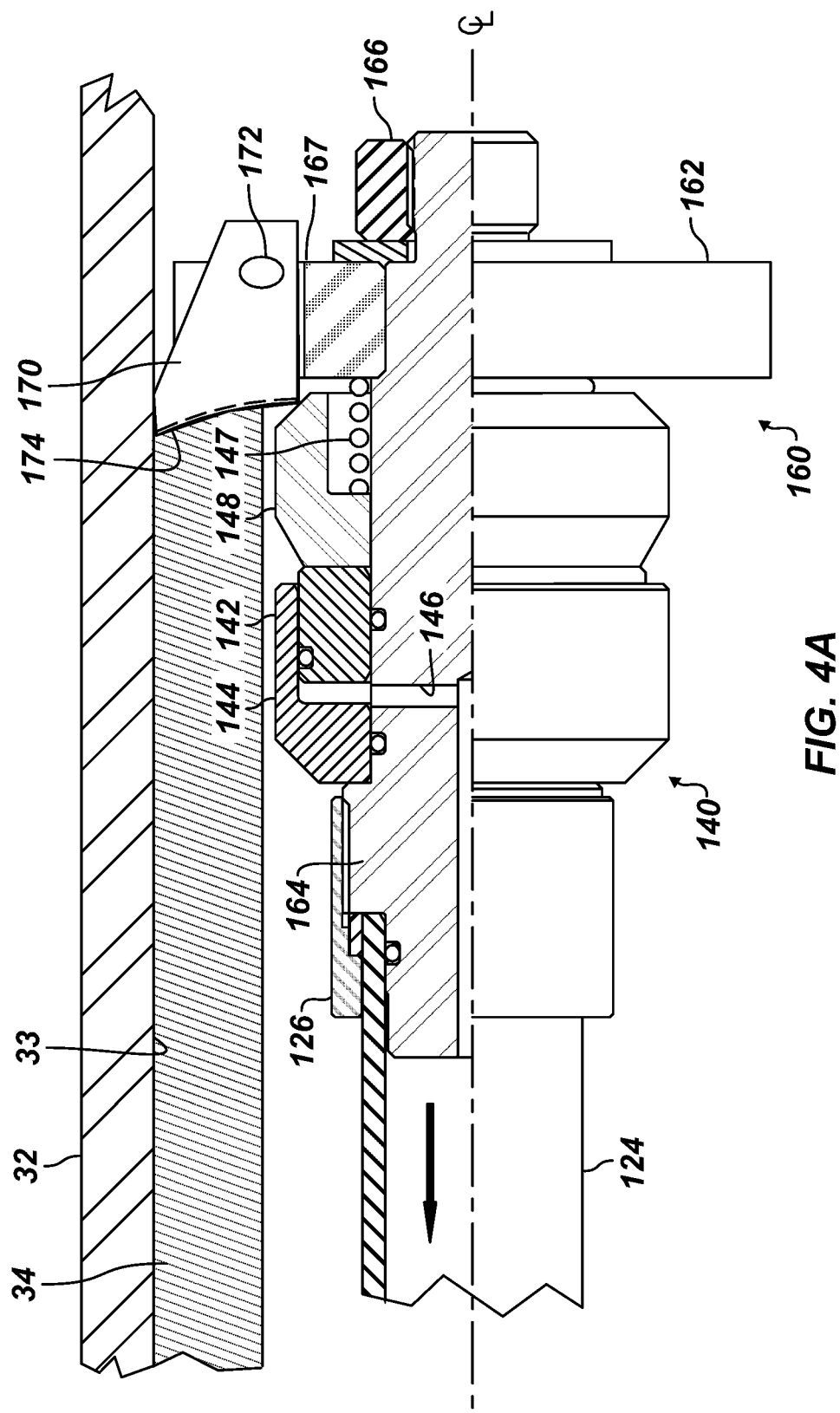

CORING APPARATUS FOR RUBBER STATOR

CROSS-REFERENCE TO RELATED APPLICATIONS

This application is a continuation of U.S. application Ser. No. 16/171,119, filed 25 Oct. 2018, which is a divisional of U.S. application Ser. No. 14/623,814, filed 17 Feb. 2015, and issued on 11 Dec. 2018, as U.S. Pat. No. 10,151,145, all of which are incorporated herein by reference in their entirety.

BACKGROUND OF THE DISCLOSURE

A mud motor 30 as shown in FIG. 1A is used in the oil drilling industry for directional drilling. The mud motor 30 is located on a bottom hole assembly 20 at the end of the drillstring 10 and has the drill bit 22 on its end. Inside a housing 32, the motor 30 has a rotor 40 and a stator 34.

During operation, drilling fluid F pumped downhole through the drill string 10 passes through the area between the rotor 40 and the stator 34. When urged by the pressures of the flowing drilling fluid F, the rotor 40 orbits inside the stator 34. A transmission shaft 24 inside the motor 30 converts the orbit of the rotor 40 to rotation of the drill bit 22, from which the drilling fluid F also exits. More rotational speed can be added to the drill bit 22 by simultaneously rotating the drill string 10 and the rotor 40.

The rotor 40 has a number of spiraling lobes 48 along its length that fit in complementary pockets of lobes 38 spiraling inside the stator 34 of the housing 30. For example, FIG. 1B illustrates an end sectional view of the motor housing 32 with the rotor 40 disposed inside the stator 34. Here, the rotor 40 has four lobes 48, and the stator 34 has five lobes 38.

To form the stator 34 for the motor 30, rubber is molded to the inside surface of the housing 32, which is typically a tubular or section of pipe. This process is outlined in U.S. Pat. No. 8,777,598. The molded rubber forms a multi-lobed cavity 36. The rotor 40, which is typically made of stainless steel, is inserted into the stator's cavity 36, and the rotor 40 generally has one less lobe than the stator 34. This allows the rotor 40 to orbit eccentrically in the stator 34 as the drilling fluid is pumped at high pressure in the cavities formed between the rotor 40 and the stator 34.

Over time, the rubber of the stator 34 becomes hard and brittle due to the high temperature environment downhole. This results in chunking and wear of the rubber seal of the stator 34 against the rotor 40. Eventually, drilling performance suffers due to wear and tear, and the motor 30 is retrieved from the hole. To rebuild the motor 30, the old rubber must be removed, and new rubber molded in.

Other downhole devices use rotors and stators, such as disclosed above. For example, a progressive cavity pump has a helical rotor and a rubber stator and is used to pump fluids in the cavities formed as the rotor is eccentrically rotated within the stator. These devices can also become worn overtime and may need rubber removal and replacement.

Removing the rubber stator material from a mud motor housing or the like has been done in various ways. For example, liquid nitrogen freezing has been used to remove the rubber from the motor housing 32. To do this, the whole housing 32 is submerged in liquid Nitrogen, causing the rubber to shrink and crack. Then, the rubber is pushed out of the housing 32 with a hydraulic ram. This process can be very expensive.

Burning is another technique that has been used to remove the rubber from the housing 32. Burning techniques are outlined in U.S. Pat. Nos. 2,291,862 and 6,966,105. To do this, the housing 32 is exposed to high temperature to effectively burn out, or break the bond of, the rubber to the stator 34. This creates noxious smoke and fumes, and the temperatures can damage the housing's integrity. The process is also slow.

A more popular form of removal uses high-pressure water blasting. The housing 32 is set up so that high-pressure water on the order of 20,000-psi to 40,000-psi at 200 Hp can be injected into the housing 32 at the rubber of the stator 34. The water blast is used to slice through the rubber and remove it in small chunks from the housing 32. Runoff water from this process must be cleaned of sediment and debris, requiring an expensive filtration system. Additionally, the process is slow and expensive.

Finally, it is conceivable that the rubber stator 34 can simply be milled, ground, or drilled out of the housing 32. As expected, the amount of debris from this would be considerable. Also, possible damage can occur to the inner surface of the housing 32 during the process, or an excess amount of material may still remain inside the housing 32, requiring further removal steps, such as water blasting.

Regardless of how rubber is removed, the inner surface of the cleaned housing 32 may again be molded with new rubber for a stator 34 so the motor housing 32 can be reused. During the rubber molding process to rebuild the stator 34, cores are used to form the inner profile. During the molding, excess rubber is typically added to the end of the housing 32 to ensure that the stator 34 is formed properly.

Once the housing 32 has been formed with the rubber stator 34 inside, the excess rubber inside the housing 32 towards the ends needs to be removed, bored to the housing's inner dimension, and chamfered with a 45-deg angle or the like. Traditionally, this is done using a large engine lathe. The motor housing 32 hangs out the end of the lathe as it is rotated, which complicates handling, and is unsafe. This process generally takes 30 minutes or more to complete for each end of the housing 32 and can be very cumbersome due to the exposed rotating housing.

The subject matter of the present disclosure is directed to overcoming, or at least reducing the effects of, one or more of the problems set forth above.

SUMMARY OF THE DISCLOSURE

An apparatus for removing rubber stator material from inside a housing comprises a head, at least one blade, and an actuator. The head is rotated about an axis and is moved along the axis relative to the housing. The at least one blade is pivotably connected to the head and removes the rubber stator material at least partially from inside the housing with the rotation and movement of the head through the housing. The actuator is associated with the at least one blade and is operable to adjust a pivot of the at least one blade relative to the head.

In addition to the at least one blade, one or more second blades can be connected to the head to remove the rubber stator material from inside the housing with the rotation and movement of the head through the housing. The one or more second blades can be fixedly connected to the head or can be pivotably connected to the head.

At least one drive can be operable to rotate and move the head and the housing relative to one another. For example, the drive can include a first drive (e.g., a motor connected to a shaft and having the head coupled thereon) operable to rotate the head. Additionally, the drive can include a second drive (e.g., motor and cart) disposed on a track and operable to move the first drive and the head along the track. A third drive can be coupled to the housing and can be operable to rotate the housing relative to the head.

During a coring operation to remove the rubber material from inside the housing, the at least one drive pulls the head through the rubber material of the housing. During a cutback operation to remove excess of newly molded rubber material from inside the housing, the at least one drive can push the head through the rubber stator material of the housing.

The actuator associated with the head can include a piston disposed on the head and movable against the at least one blade in response to power supplied from a source. Another embodiment can include an adjustable biasing element or spring means, applying a force against the head, or actuator, moveable against at least one blade. During operation, the apparatus rotates the head at a rotational speed and moves the head at a traverse speed. For its part, the actuator adjusts the pivot of the at least one blade with a force. Overall, the rotational speed, the traverse speed, and the force are coordinated so that the rubber material is preferably removed as an elongated strip from inside the housing.

In a method of removing rubber stator material from inside a housing, a head is rotated about an axis relative to the housing, and the head is moved along the axis relative to the housing. The rubber stator material is at least partially removed from inside the housing with the rotation and movement of the head through the housing by engaging at least one blade on the head against the rubber stator material. A pivot of the at least one blade is adjusted relative to the head. In longer housings, usually over 21 feet, the inside diameter may increase by ¼" to ⅜" towards the middle portion, termed "belly hone," requiring a moveable or pivoting blade or blades to follow the inside profile and remove most or all the rubber material.

The foregoing summary is not intended to summarize each potential embodiment or every aspect of the present disclosure.

BRIEF DESCRIPTION OF THE DRAWINGS

FIG. 4A illustrates a partial cross-sectional view of a coring head and actuator for the disclosed apparatus disposed on an end of a drive shaft

DETAILED DESCRIPTION OF THE DISCLOSURE

Figures 1A, 1B:
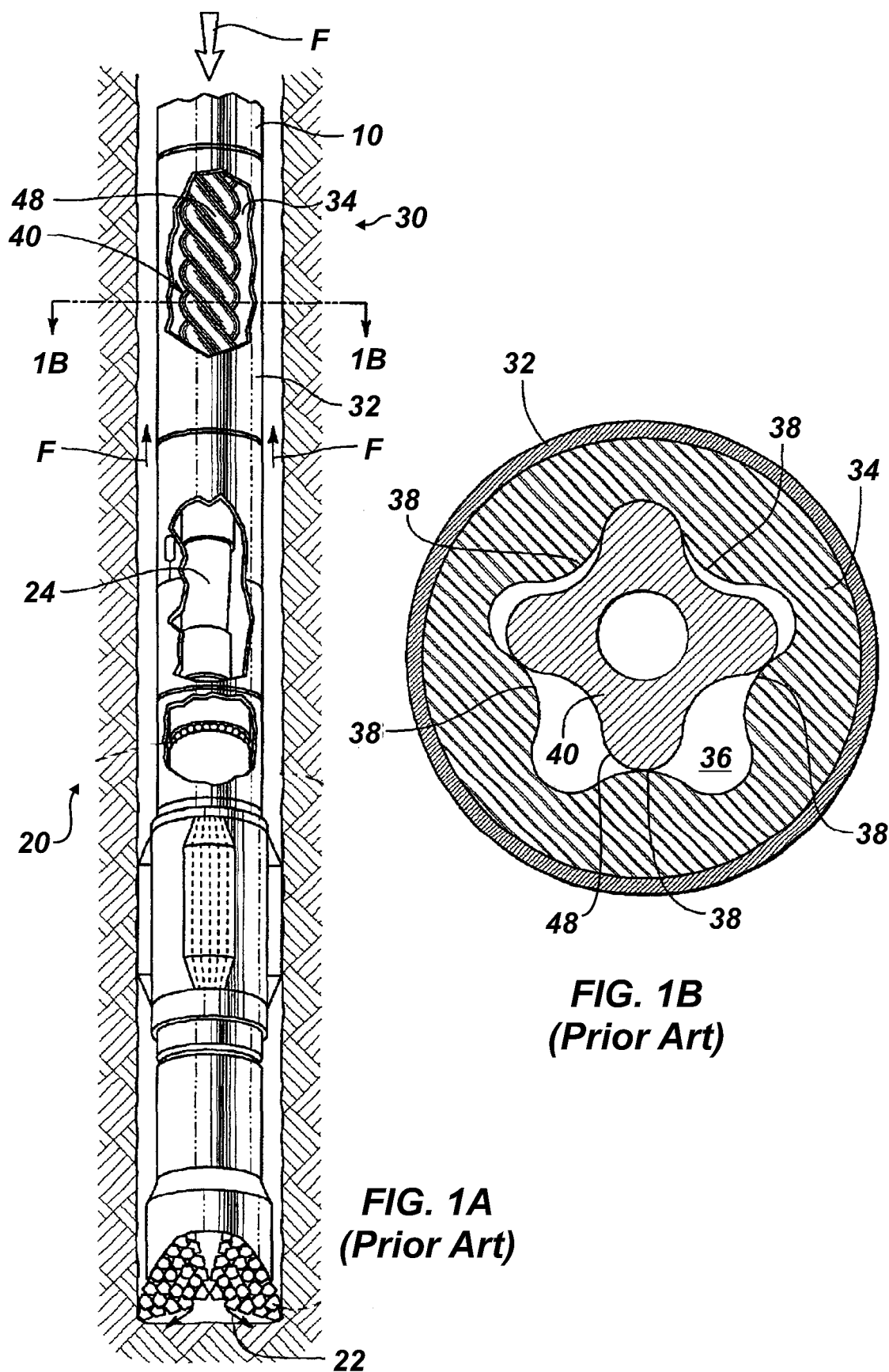
FIG. 1A illustrates a mud motor having a rotor and a stator in a motor housing.
FIG. 1B illustrates an end sectional view of the motor housing with the rotor disposed inside the stator.

As noted previously, conventional techniques for removing rubber of a stator from a housing can be expensive and time consuming. Disclosed herein is an apparatus and technique for mechanical removal of the rubber material from inside a housing, such as a rubber stator inside a mud motor housing, a progressive cavity pump, or the like.

In particular, an apparatus (100/200) removes rubber stator material from inside a housing 32, such as used in a downhole mud motor or progressive cavity pump. In one embodiment (e.g., FIG. 2), the apparatus 100 cores out the rubber stator material 34 from inside the housing 32 when the material needs to be replaced with a new molding. In another embodiment (e.g., FIG. 9), the apparatus 200 cuts back an excess portion of the rubber stator material 34 from an end inside the housing 32 when newly molded material has been formed.

In both embodiments, the apparatus 100/200 includes a head 160/260 and a drive system 110/210. The head 160/260 is rotated about an axis and is moved along the axis relative to the housing 32. Preferably, the head 160/260 is rotated and moved axially while the housing 32 remains stationary. However, the housing 32 can be counter-rotated, which can have benefits as discussed below. In any event, it is possible for the housing 32 to be rotated while the head 160/260 remains stationary and/or for the housing 32 to be moved axially while the head 160/260 remains stationary. Moreover, both the housing 32 and the head 160/260 can be rotated and/or moved.

The head 160/260 has one or more blades 170/270 that remove the rubber stator material 34 at least partially from inside the housing 32 with the rotation and movement of the head 160/260 through the housing 32. Although each of the one or more blades 170/270 can have a fixed orientation on the head 160/270, at least one of the one or more blades 170/270 is preferably connected to the head 160/260 with a pivotable connection that allows the at least one blade 170/270 to pivot on the head 160/260. Moreover, an actuator 140/240 is associated with the at least one pivotable blade 170/270 and is operable during the removal process to adjust a pivot of the at least one blade 170/270 relative to the head 160/260.

Looking in particular at FIGS. 2 through 7, the apparatus 100 is used for coring out the rubber stator material 34 from inside the housing 32. The apparatus 100 has a drive system 110 having a cart 112, a first drive 120, and a second drive 116. The first drive 120 disposed on the cart 112 rotates a shaft 124. As shown, the shaft 124 is passable through the housing 32 and rotates the head 160 disposed on its distal end. The second drive 116 is also disposed on the cart 112 and moves the cart 112 along a track system 118 having rails 119. As the drive 116 moves the cart 112 along the rails 119, the rotating shaft 124 is moved axially relative to the housing 32.

To core out the rubber material 34, the housing 32 is supported in-line opposite to the drive system 110. For example, the apparatus 100 can use self-centering pipe racks (not shown) to support the housing 32. The shaft 124 coupled to the drive system 100 is inserted all the way through the housing 32 with its rubber material 34 therein, and the head 160 is coupled to the end of the shaft 124. In general, the head 160 has one or more blades 170 thereon, and at least one of the blades 170 is pivotable as discussed below.

With the operation of the drives 116 and 120, the head 160 is rotated about the axis of the shaft 124 and is pulled along the axis through the housing 34. During this process, the one or more blades 170 connected to the head 160 removes the rubber stator material 34 at least partially from inside the housing 32 with the rotation and pulling of the head 160 through the housing 32. The removal is controlled in part by controlling a rotational speed of the head 160 in the housing 32 and controlling a traverse speed as the head 160 is pulled through the housing 32. In particular, the rotational speed of the head 160 is provided by the first drive 120 and other components of the drive system 110. This rotational speed can be coordinated with the traverse speed of the head 160 provided by the second drive 116 and other components of the drive system 110.

Additionally, the removal is controlled in part by the actuator 140 associated with at least one blade 170 pivotably connected to the head 160. In particular, the actuator 140, which operable to adjust the pivot of the at least one blade 170 relative to the head 160, can adjust the force against the at least one pivotable blade 170, either further expanding or retracting the blade's pivot from the head 160 relative to the inside of the housing 32. In this way, the at least one pivotable blade 170 can be pivoted closer to the inside surface 33 of the housing 32, for example, to cut the rubber material closer to the housing's inside surface 33.

As a goal, operation of the apparatus 100 seeks to cut, slice, shear, etc. the rubber material 34 from inside the housing 32 as an elongated strip, which can then be pulled from the distal end of the housing 32 as the head 160 is pulled and rotated through the housing 32 toward the proximal end. Once removed, the rubber can be recycled and added as a filler to tires, asphalt, floor coverings, etc.

The one or more blades 170 rotated and pulled along the length of the housing 32 tends to cut the rubber material 34 in a spiral pattern so that the cut material can be removed from the housing's surface 33 as a strip. Additionally, the one or more blades 170 rotated and pulled along the length of the housing 32 tends to shear the rubber material 34 from the housing's surface 33 and can scrap close to the surface 33. Preferably during the removal process, the one or more blades 170 cut the rubber material 34 close to or into an adhesive layer (not shown) that is typically used between the inside surface 33 of the housing 32 and the molded rubber material 34. Being able to pivot the at least one pivotable blade 170 on the head 160 allows the cutting and shearing provided by the head 160 to be properly adjusted as needed.

The first drive 120 can be an electric or hydraulic motor coupled to the shaft 124. To control rotation and torque, a gear box 122 and other components (i.e., transmission, couplings, detachment, etc.) may be used between the motor's rotation and the shaft 124. Additionally, a frame (not shown) having pillow blocks, bearings, or the like can be installed on the track 118 to help support the shaft 124 cantilevered from the first drive 120.

As noted above, the head 160 is preferably rotated while the housing 32 remains stationary. In any event, a third drive (not shown) coupled to the housing 32 can be operable to counter rotate the housing 32 relative to the head 160. Because the shaft 124 is quite long (e.g., as long as the housing 32) and is cantilevered from the drive 120 into the housing 32, gravity may cause the head 160 to preferentially clear more rubber material 34 from along the bottom of the surface 33 inside the housing 32. To counter act this, the housing 32 can be rotated in an opposite direction, and this rotation can be coordinated with the other operational parameters to achieve the desired removal.

Figure 3A:
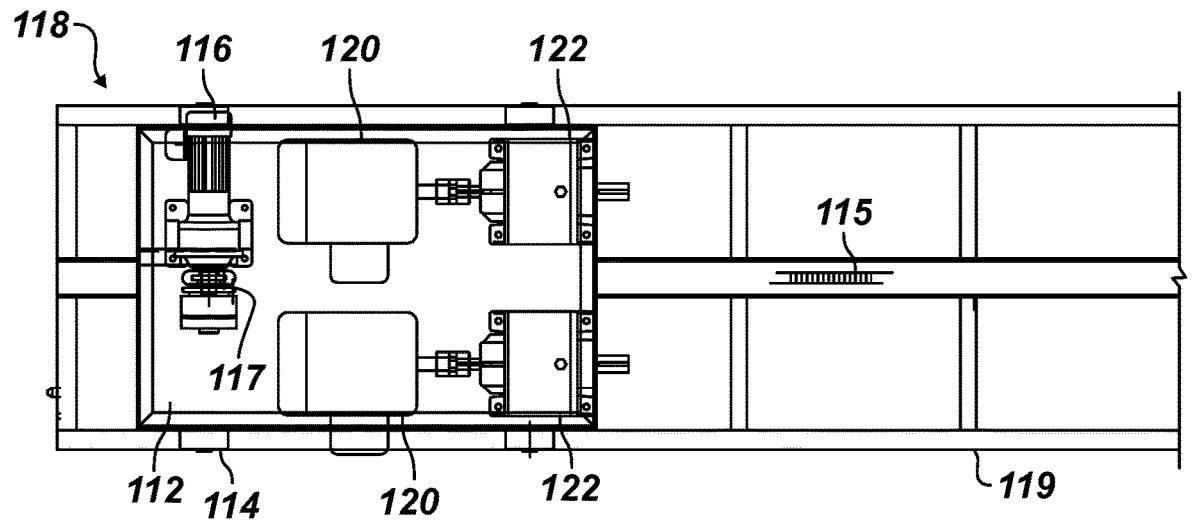
FIG. 3A illustrates a plan view of one arrangement of the track and drive system for the disclosed coring apparatus.
Figure 3B:
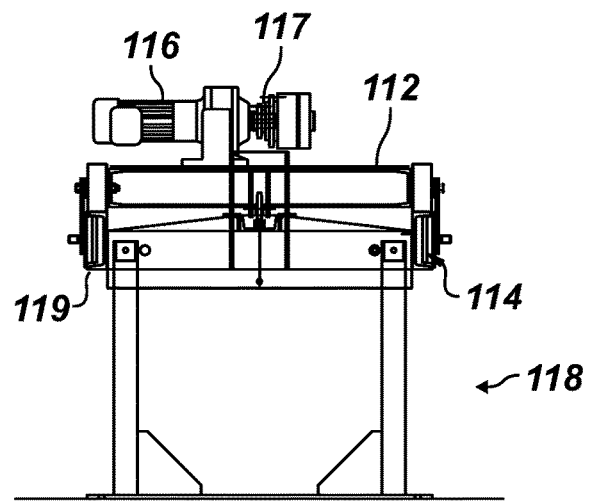
FIG. 3B illustrates a back view of the arrangement of the disclosed coring apparatus in FIG. 3A.

As shown in FIGS. 3A-3B, one arrangement of the drive system 110 for the disclosed coring apparatus 100 can have dual drives 120 together on the cart 112. In this way, two housings (32) can have the rubber stator material (34) cored out at the same time using parallel coring components (e.g., 124, 140, 160, 170, etc.).

As shown in FIG. 3A, the second drive 116 disposed on the cart 112 can be coupled by a sprocket 117 to a chain 115 of the track system 118. Additionally, the cart 112 has wheels 114 riding in the rails 119 of the track system 118. Finally, the second drive 116 can be an electric or hydraulic motor and may also have a gearbox disposed on the movable cart 112. During operation, the chain 115 connected to the drive 116 is used to move the cart 112 along the track system 118 so the coring head(s) (160) can be pulled through the motor housing(s) (32). The track system 118 stabilizes the apparatus 100 against the coring torque and longitudinal forces while providing a guiding system for the coring apparatus 100. As will be appreciated with the benefit of the present disclosure, other arrangements can be used for the drive system 110 of the apparatus 100.

FIG. 4A illustrates the coring head 160 and actuator 140 for the disclosed apparatus 100 disposed on an end of the drive shaft 124 adjacent portion of the housing 32 and rubber stator material 34. The coring head 160 has a head body 162 that affixes to a coring body 164 with a nut 166 or cap screw. The coring body 164 in turn connects to the drive shaft 124, for example, using a drive pin arrangement (not shown) and threaded collar 126 for quick changeover due to changes in housing diameters. Also, the coring head 160 is removed to allow insertion of the coring shaft 124 through the rubber stator 34 before coring can proceed as the head 160 is pulled through the housing 32 while rotating.

The head body 162 can be disc-shaped with the one or more blades 170 disposed thereabout in cutaways 167. In general, the one or more blades 170 can be composed of steel or other suitable material and can be oriented at an angle (e.g., of 0 to 90-deg) relative the rotational axis of the head 160. As the head 160 rotates, the one or more blades 170 ride along housing's inner surface 33 and mechanically "slice" and shear the rubber material out in long "ropes" for easy removal from the opposite direction to the head's movement.

As noted herein, at least one of the blades 170 is movable or pivotable on the head 160. During rotating, the at least one pivotable blade 170 is biased outward during coring, and the geometry of the pivotable blade 170 provides increased cutting force against the housing's inner surface 33 as applied torque for coring increases. The pivotable blade 170 swivels at its mounting point 172 to the coring head's body 162, which allows the pivotable blade 170 to adjust and follow the housing's inner surface 33.

To further increase cutting, the coring apparatus 100 has the actuator 140 for the at least one pivotable blade 170. As shown here in FIG. 4A, for example, the actuator 140 is disposed on the coring body 164. The actuator 140 has a hydraulic or pneumatic cylinder 144 and piston 142 disposed on the coring body 164 and movable against the pivotable blade 170. When energized, the piston 142 provides increased cutting blade force from the at least one pivotable blade 170 for enhanced rubber removal.

In particular, the piston 142 is disposed in the cylinder 144 with one or more ports 146 exposed to the inside 125 of the drive shaft 124. O-rings can seal communication of the port 146 to the chamber between the piston 142 and cylinder 144. Power (pneumatics or hydraulics) supplied through the shaft 124 can push the piston 142 in the cylinder 144 axially toward the at least one pivotable blade 170 on the head 160. The piston 142 moves or has an actuator ring 148 with an angle from zero to 90 degrees, which provides increased cutting force in response to air or fluid pressure from the cylinder 144. Pushed by the piston 142, the angled actuator ring 148 wedges against the at least one pivotable blade 170, causing it to pivot outward from the rotational axis. Release of the power allows a spring 147 to force the piston 142 and ring 148 away from the at least one pivotable blade 170.

Figure 2:
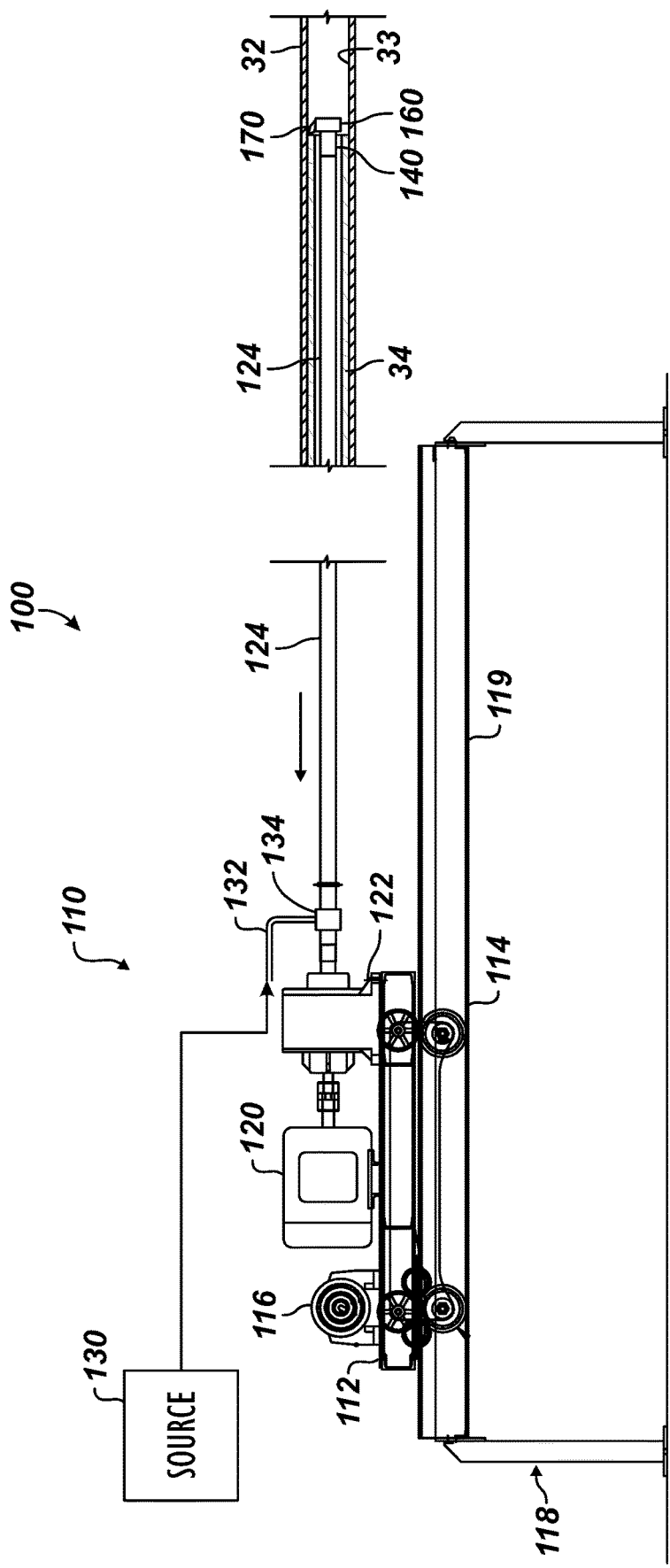
FIG. 2 illustrates a side view of an apparatus for coring rubber stator material from a motor housing.

The source of the power (spring, pneumatics, or hydraulics) for the actuator 140 can be coupled to the shaft 124 at any desirable point. Preferably, as shown in FIG. 2, a pneumatic or hydraulic swivel 134 connects a line 132 from a source 130 to the shaft 124. As the shaft 124 is rotated, the swivel 134 transfers the hydraulic or pneumatic pressure from the source 130, into the rotating coring shaft 124, and to the cutting head 160 to actuate the at least one pivotable blade 170 with the actuator 140 (FIG. 4A). Adjacent the swivel 134, the end of the shaft 124 can have a disconnect that includes a swivel nut, a seal, and a drive feature (e.g., a steel pin or splines) to transfer torque and pressure to the coring head 160 disposed on the end of the shaft 124. This disconnect feature is advantageous due to many different pipe diameters used, and affords quick changeover while allowing the head 160, the shaft 124, and the actuator 140 to be in assembly form.

Figure 4B:
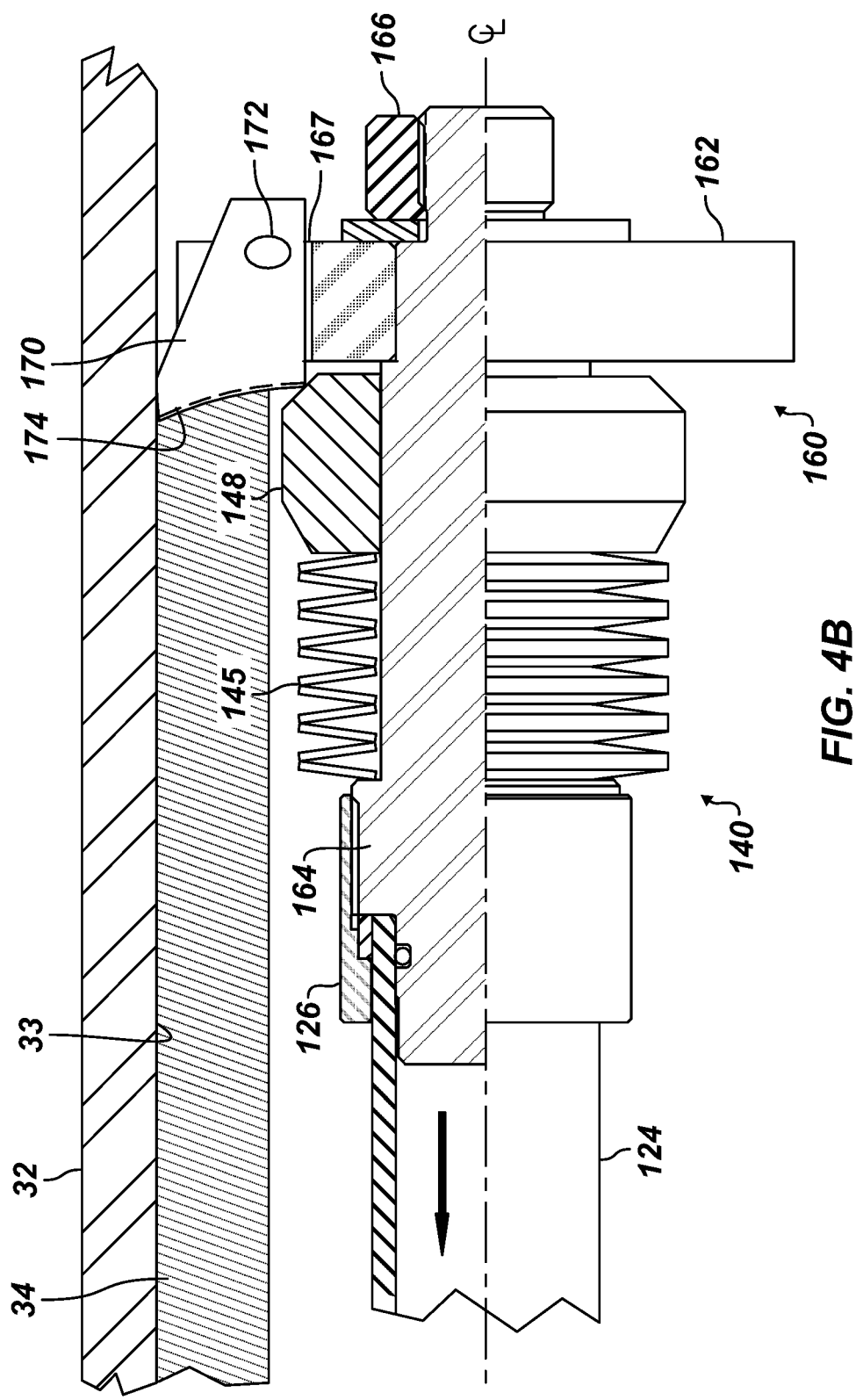
FIG. 4B illustrates a partial cross-sectional view of another coring head and actuator for the disclosed apparatus.

FIG. 4B illustrates another coring head 160 and actuator 140 for the disclosed apparatus 100 disposed on an end of the drive shaft 124 adjacent portion of the housing 32 and rubber stator material 34. The coring head 160 is similar to that disclosed above and has a head body 162 that affixes to a coring body 164 with a nut 166 or cap screw. The coring body 164 in turn connects to the drive shaft 124, for example, using a drive pin arrangement and threaded collar 126.

The head body 162 has the one or more blades 170—at least one of which is movable or pivotable on the head 160. To further increase cutting, the coring apparatus 100 has the actuator 140 for the at least one pivotable blade 170. As shown here in FIG. 4B, the actuator 140 has a biasing member or spring 145 disposed on the coring body 164 that pushes an actuator ring 148 against the pivotable blade 170 to increase the cutting blade force from the at least one pivotable blade 170 for enhanced rubber removal. The spring 145, in the form of stacked discs or the like, installs on the coring body 164, and the head body 162 then mounts on the coring body 164 and is held by the mounting nut 166.

The force provided by the spring 145 can be configured during assembly of the head 160 on the end of the pipe 124 before coring at the start of the housing 32. For example, the spring 145 can be selected for a particular compressive force. A threaded nut (not shown) disposed toward the back end of the spring 145 may be adjustable along the outside of the coring body 164 to adjust the spring's bias. Alternatively, the mounting nut 166 can be adjusted to compress the spring 145 to a desired amount of bias.

Depending on the characteristics of the rubber material (34) to be removed, such as its thickness, hardness, and the like, the apparatus 100 of the present disclosure rotates the head 160 at a rotational speed and moves the head 160 at a traverse speed that are coordinated. Also depending on the characteristics, a particular number of the one or more blades 170 can be used, their angle or orientation on the head 160 can be set, and the pivot and force provided by the actuator 140 for the at least one pivotable blade 170 can be coordinated with the other operational parameters.

Figure 5:
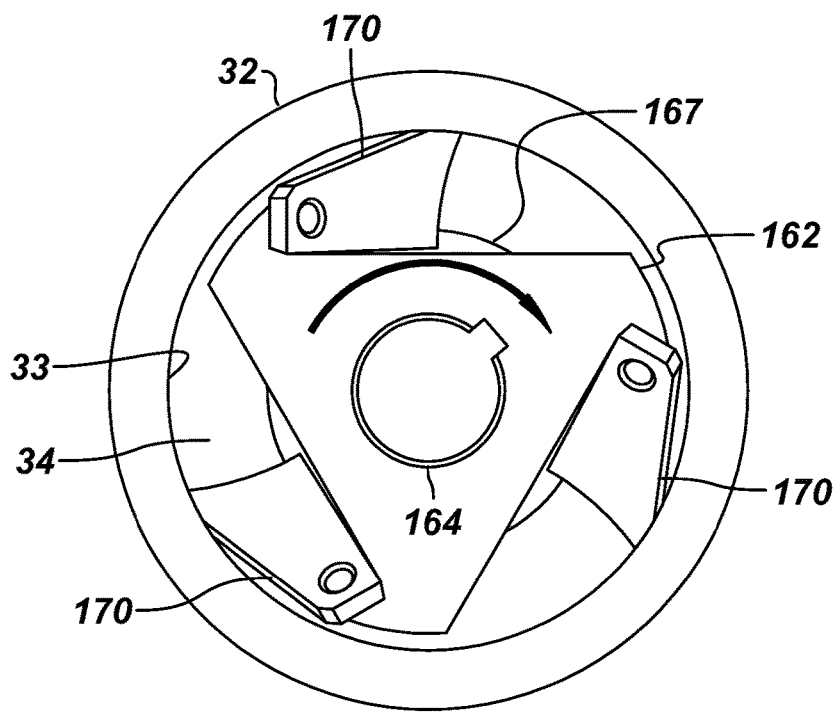
FIG. 5 illustrates an end view of the coring head.

As noted herein, the head 160 can have at least one pivotable blade 170. As shown in the end view of FIG. 5, for example, the head 160 can have three pivotable blades 170 disposed in cutaways 167 of the head's body 162. The blades 170 connect to the cutaways 167 at pivot points 172 using pins or the like. As also shown in FIG. 5, the head body 162 can be triangular in shape and can fit onto a key joint on the coring body 164 where a fastener (not shown) can affix the head body 162 in place.

As understood herein, not all of the blades 170 need to be pivotable on the head 160. Instead, one or more of the blades 170 can be at fixed angles on the head 160. In one particular example, the head 160 can have three blades 170 with one of the blades being pivotable and the other two being fixed.

Figure 6:
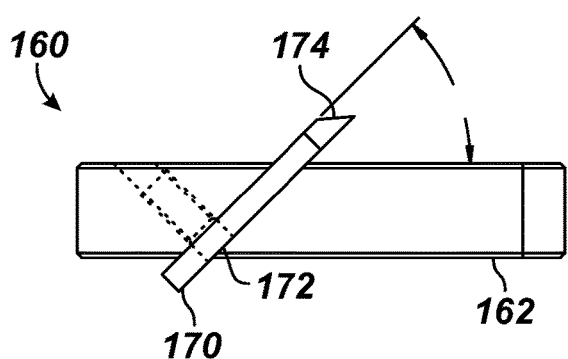
FIG. 6 illustrates a plan view of a blade on the coring head.
Figure 7:
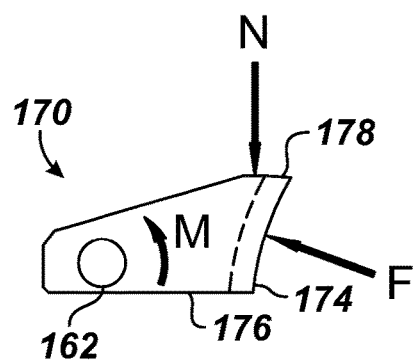
FIG. 7 illustrates an isolated view of a blade for the coring head and forces applied.

As shown in the plan view of FIG. 6, the blade 170 can be angled on the head body 162. For example, the blade 170 can be angled at a coring angle from 0 to 90-deg relative to the axis of rotation. Additionally, as shown in the isolated view of FIG. 7, the blade 170 has a pivot point 172 at one end and widens out therefrom in a triangular shape toward a cutting edge 174. As shown, the cutting edge 174 can be curved and can generally be angled from perpendicular relative to the flat bottom edge 176 of the blade 170. Due to blade geometry, a cutting forces (F) creates a moment (M), adding increased normal force (N) between cutting blade surface (178) and pipe inside surface (33) and improving cleaning of rubber (34) from pipe wall. Finally, the tip of the blade 170 can have a flat top or radius edge 178, which can engage against the inside surface (33) of the housing (32).

Figure 8:
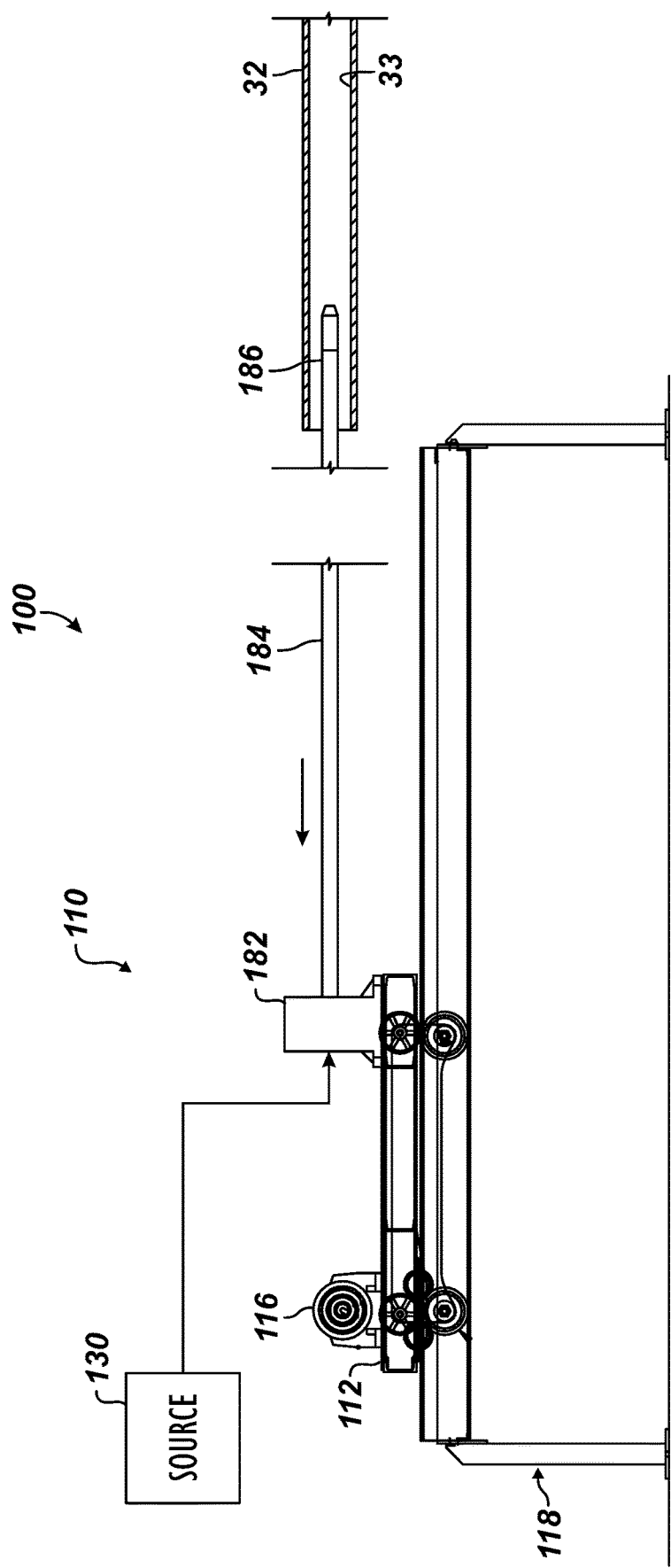
FIG. 8 illustrates a side view of a sand blasting apparatus for cleaning the interior of the motor housing.

After coring out the rubber stator material 34, the inside surface 33 of the housing 32 can be further cleaned to remove any remaining rubber and adhesive left. For example, FIG. 8 illustrates a side view of a sand blasting apparatus 100 for cleaning the interior of the housing 32. As before, the apparatus 100 uses the drive system 110 having a cart 112, a drive 116, and a track system 118, among other components discussed previously. A sandblast source 180 connects to a distributor 182 on the cart 112. A pipe 184 extends from the distributor 182 and conducts sandblasting material (e.g., compressed air and sand) to a nozzle 186 on its end.

During operations, the nozzle 186 and pipe 184 are initially extended all the way through the housing 32. As sandblasting material is the conducted out of the nozzle 186 to clean the inside surface 33 of the housing 32, the cart 112 moves by the drive 116 along the track system 118. This pulls the head 186 through the housing 32 so that successive lengths of the inside surface 33 can be cleaned. This continues until the head 186 reaches the end of the housing 32. Although not shown, the other end of the housing 32 may connect to a collection tank or the like to catch the expelled sand, residual rubber and adhesive, and the like. When done, the inside surface 33 of the housing 32 can be sandblasted down to white metal for eventual reuse.

As noted previously, the excess rubber material 34 at the end of the housing 32 after molding of a new stator in the housing 32 needs to be removed, bored to the housing's inside surface 34, and chamfered with a desired (e.g., 45-deg) angle. To that end, additional embodiments include the disclosed apparatus 200 having a rubber cutback feature.

Looking now at FIGS. 9 through 11C, the apparatus 200 for cutting back the rubber stator material 34 from inside an end of the housing 32 is shown. The apparatus 200 is comparable to the previously discussed embodiment so that similar reference numbers are used for like components, which are not necessarily described again for the sake of brevity.

The apparatus 200 has a drive system 210 with a cart 212, a first drive 220, and a second drive 216. The first drive 220 is disposed on the cart 112 and rotates a shaft 224 passable into the housing 32. The shaft 224 rotates a head 260 disposed on its distal end. The second drive 216 is also disposed on the cart 212 and moves the cart 212 along a track system 218 having rails 219. As the drive 216 moves the cart 212 along the rails 219, the rotating shaft 224 is moved axially relative to the housing 32.

To cut back the rubber material 34, the head 260 is coupled to the end of the shaft 224, and the head 260 is inserted into the end of the housing 32 with its rubber material 34 therein. Then, operating the drives 216 and 220, the head 260 is rotated about the axis and is pushed along the axis further into the housing 34 and then pulled out of the housing 34. During this process, one or more blades 270 connected to the head 260 removes excess rubber stator material 34 at least partially from inside the housing 32 with the rotation and movement of the head 260 through the housing 32. The removal is controlled in part by controlling a rotational speed of the head 260 in the housing 32 and controlling a traverse speed as the head 260 is moved through the housing 32.

Additionally, at least one of the blades 270 is pivotably connected to the head 260. In this way, the removal is controlled in part by the actuator 240 associated with the at least one pivotable blade 270. In particular, the actuator 240, which is operable to adjust the pivot of the at least one blade 270 relative to the head 260, can adjust the force against the at least one blade 270, either further expanding or retracting the blade's pivot from the head 260 relative to the inside of the housing 32. In this way, the at least one blade 270 can be pivoted closer to the inside surface 33 of the housing 32, for example, to cut the rubber material 34 closer to the housing's inside surface 33.

Using the cutback feature, the housing 32 remains stationary while the rotating cutting head 260 is inserted in the end of the housing 30, adding to increased safety for the operation. Although only one end is shown, rotating heads 260 can be inserted into both ends of the housing 32 in another arrangement to simultaneously cutback excess rubber material 34 at both ends of the housing 32. A section of track 218 (about 10-ft) is used to provide the cutback travel into the end of the housing 32. Typically, the travel for the cutback operation can be about 36-in.

Sensors and electronic control can allow automation of the process. For example, an operator can set the cutback depth and then start the process to run automatically. The rotating head 260 can be guarded with a cover that must be in place to start the operation.

During the cutback operation, the shaft 224 on the drive system 210 is passable into and out of the end of the motor housing 32. In this way, the head 260 with the at least one pivotable blade 270 can cut back excess rubber material 34 of the stator inside the housing 32 and can give the end of the material 34 a preferred angle (e.g., 45-deg.). In general, the head 260, the at least one pivotable blade 270, and the actuator 240 can be similar to those used for coring out the rubber material 34. In other words, the actuator 240 can be disposed on the shaft 224 to move axially forward against the at least one pivotable blade 270 and push the at least one pivotable blade 270 outward. The head 260 with its at least one pivotable blade 270 can be rotated and moved into the end of the housing 34 to cut back the material 24 and can then be moved out of the end to further remove any remaining material close to the inside surface 33 of the housing 32.

Figure 9:
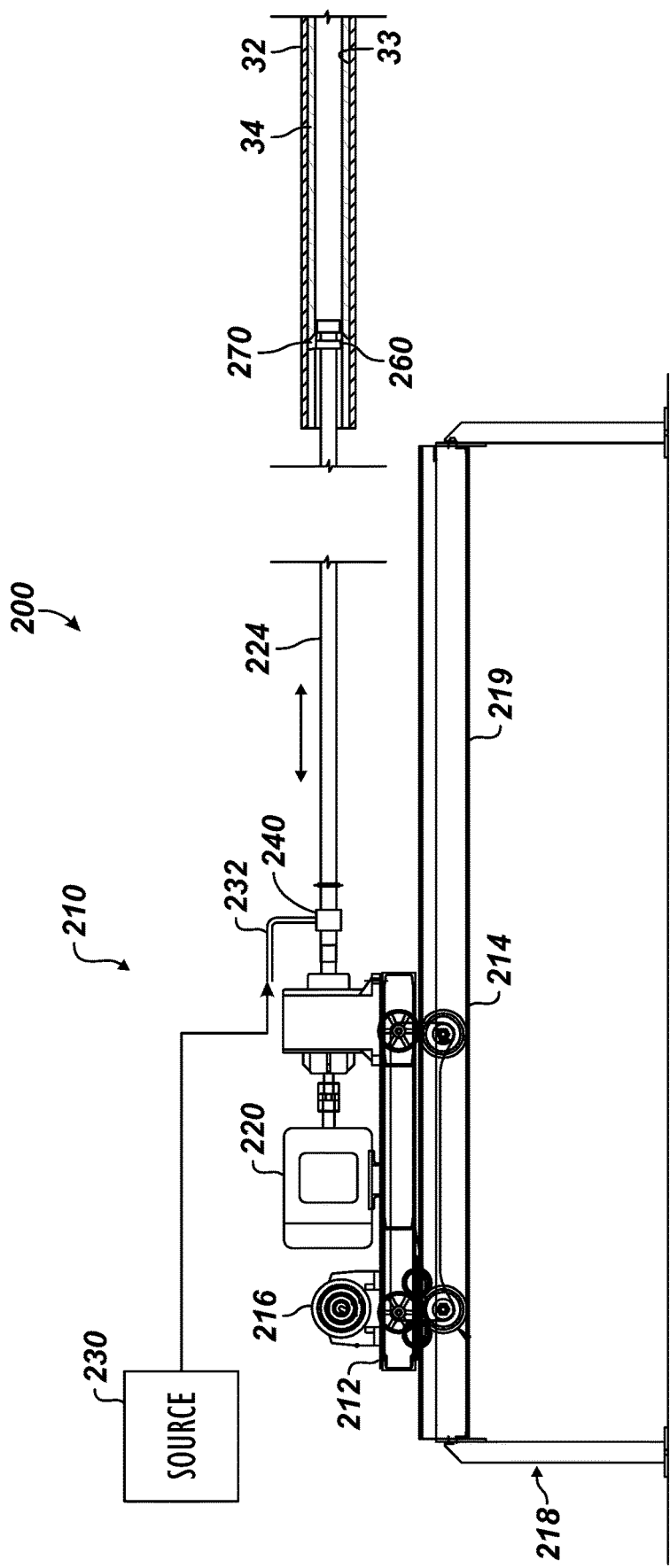
FIG. 9 illustrates a side view of an apparatus for cutting back excess of newly formed rubber stator material from a motor housing.

Preferably, however, a different configuration is used as shown in FIG. 9. As shown here, the at least one pivotable blade 270 on the head 260 pivots opposite to the previous configuration, and the actuator 240 applies the pivot from an opposite direction. In general, the actuator 240 is disposed toward the proximal end of the shaft 224 close to the drive system 210. When activated, the actuator 240 pulls along the axis of the shaft 224 and moves the at least one pivotable blade 270 outward from the head 260.

Figure 10A:
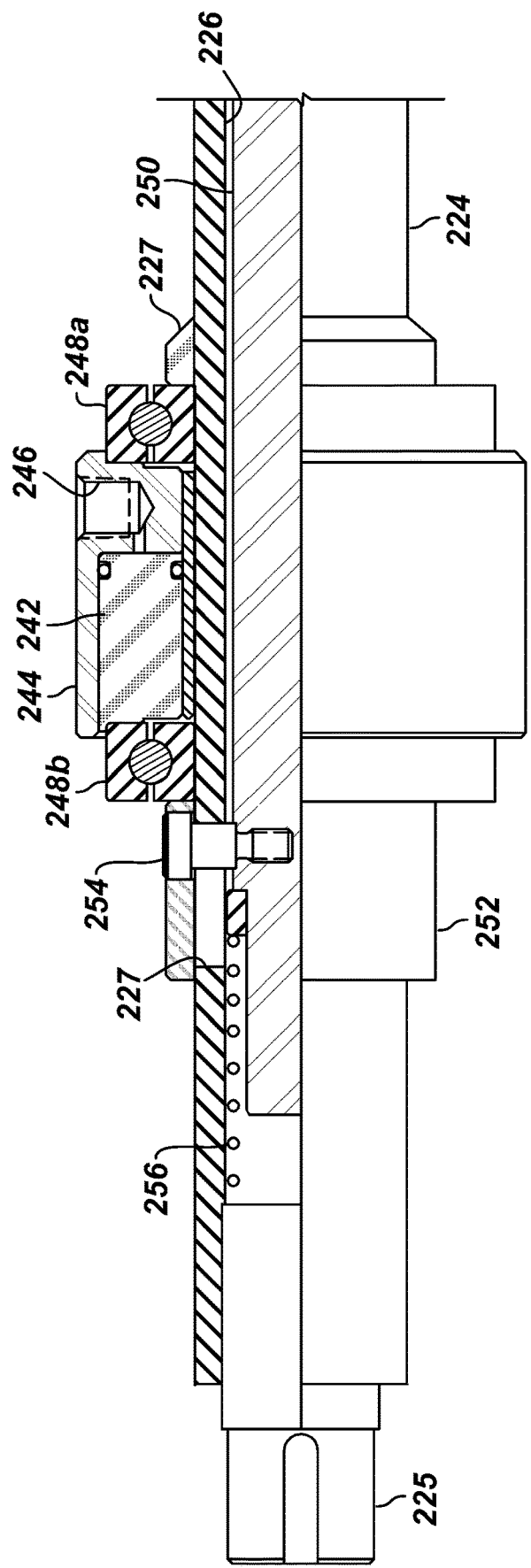
FIGS. 10A-10B illustrate cross-sectional views of a cutback device actuator for the disclosed apparatus disposed on one end of a drive shaft.
Figure 10B:
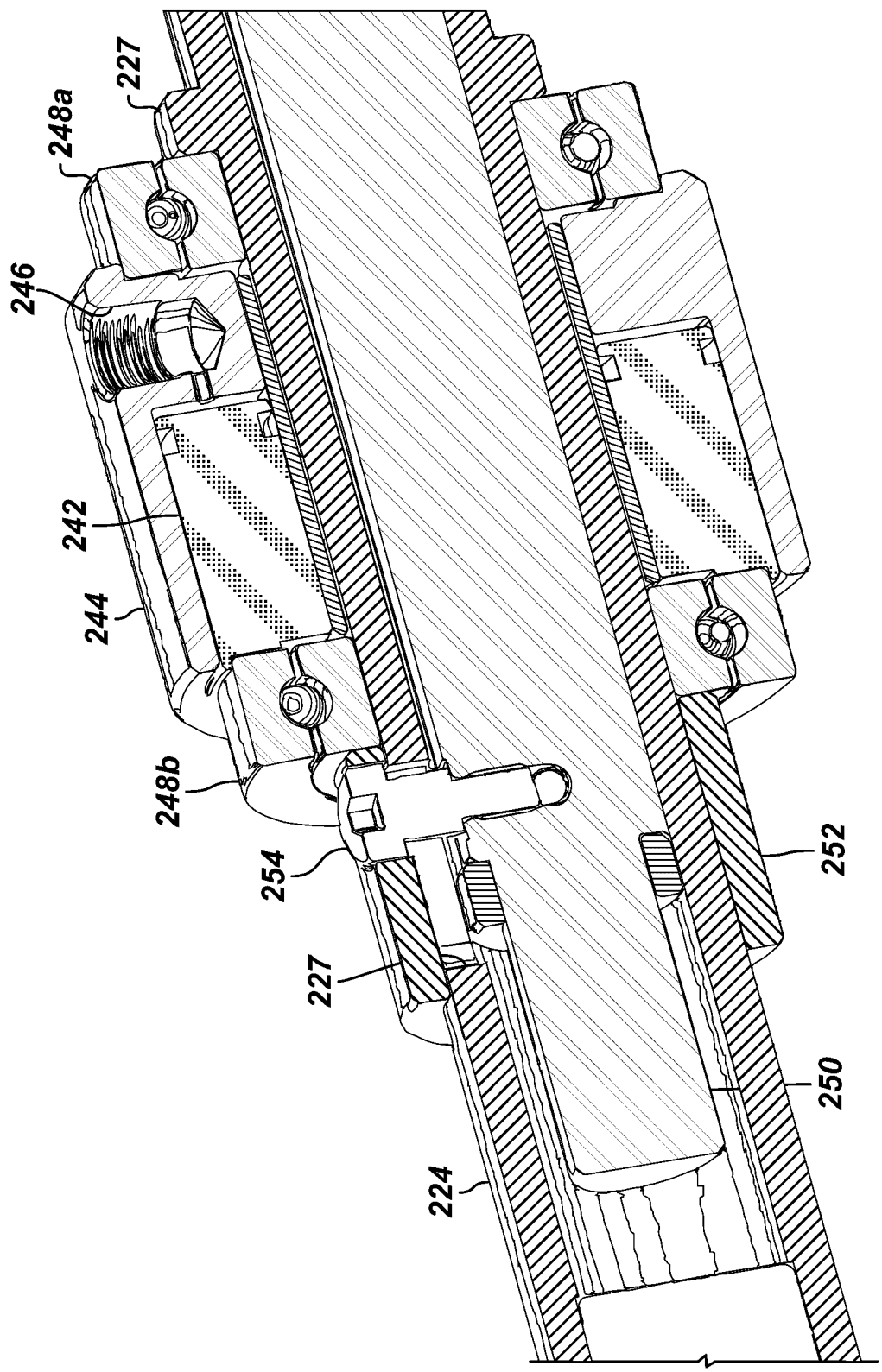

In particular, FIGS. 10A-10B illustrate an embodiment of the actuator 240 for the disclosed apparatus 200 disposed on a proximal end of the drive shaft 224. The shaft's end has a torque input 225 for coupling to the gear box, motor, and other components of the drive system 210. A draw bar 250 is movable inside the bore 226 of the shaft 224 and can be drawn axially by a draw stroke (e.g., about ¼-in to 1-in). A hydraulic or pneumatic cylinder 244 fits about the shaft 224 and has bearings 248a-b at each end. One bearing 248a rests against a fixed shoulder 227 on the shaft 224, such as provided by a welded ring. The other bearing 248b rests against a reaction sleeve 252 connected by a pin 254 or the like to the draw bar 250.

Power (pneumatics or hydraulics) supplied at the inlet 246 of the cylinder 244 pushes a piston 242 inside the cylinder 244. In turn, the piston 242 pushes against the bearing 248b and reaction sleeve 252, causing the draw bar 250 to slide inside the shaft's bore 226. The connection pin 254 between the reaction sleeve 252 and the draw bar 250 can move inside a slot 227 of the shaft 224. This operations moves the draw bar 250 of the actuator 240 back, which in turn alters the pivot of the at least one pivotable blade (270) on the cutback head (260) as disclosed below. When the supply of power is stopped, a spring 256 inside the shaft 224 can force the draw bar 250 back to its original position.

Figure 11A:
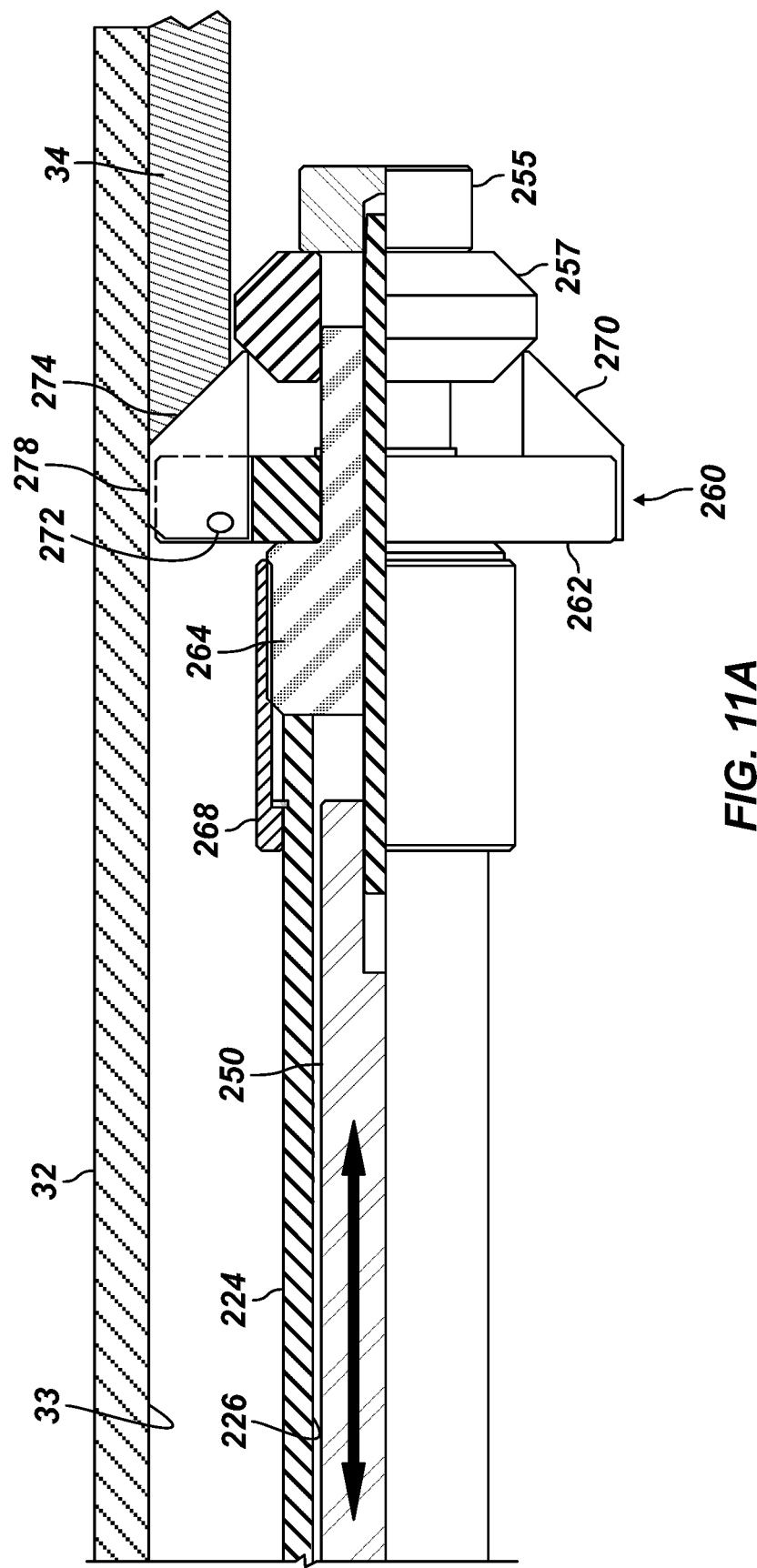
FIGS. 11A-11B illustrate cross-sectional views of a cutback head for the disclosed apparatus disposed on another end of the drive shaft.
Figure 11B:
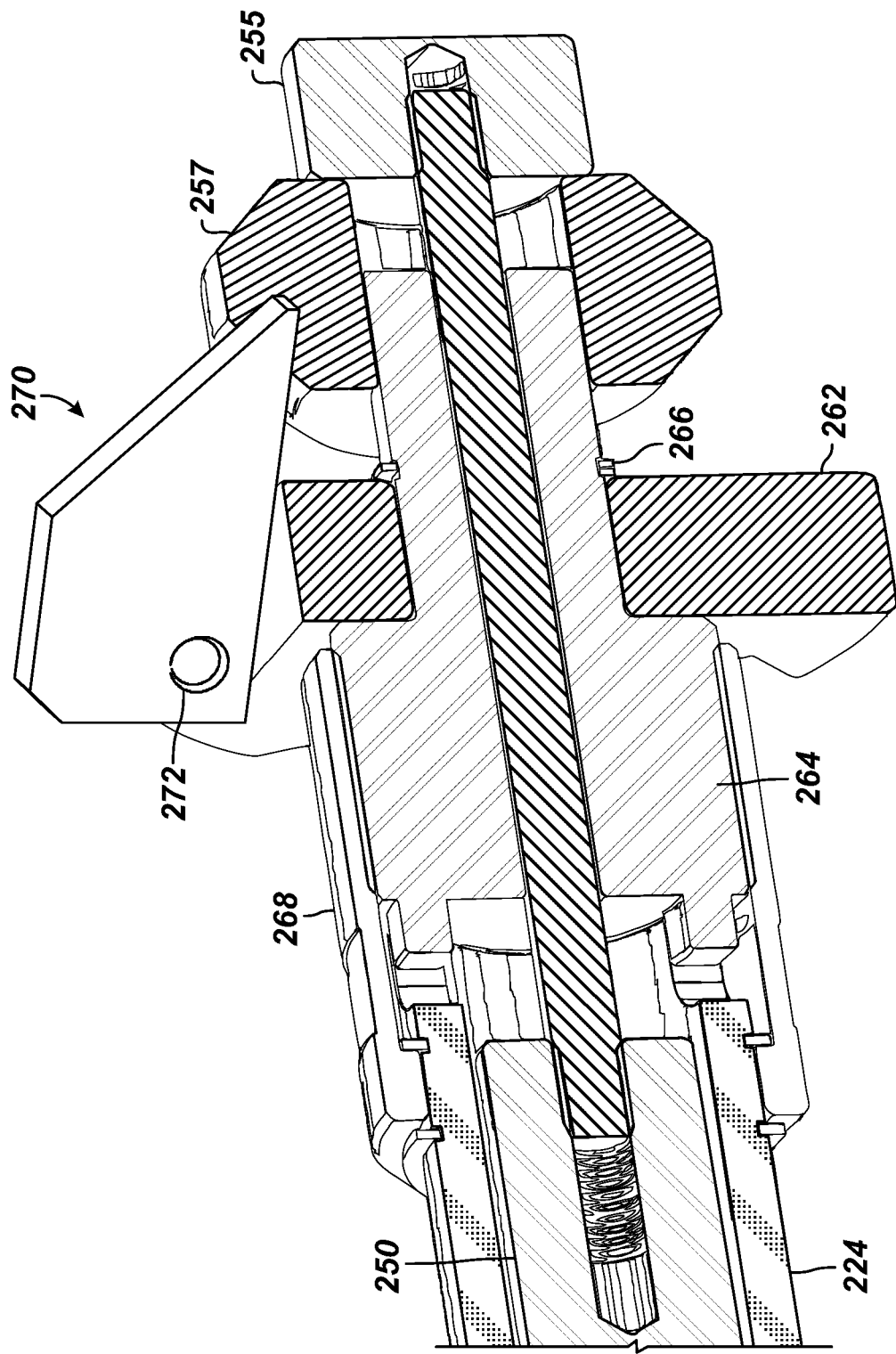

FIGS. 11A-11B illustrate an embodiment of a cutback head 260 for the disclosed apparatus 200 disposed on the distal end of the drive shaft 224. The cutback head 260 has a head body 262 with one or more blades 270 affixed thereto. At least one of the blades 270 is pivotable on the head body 262 about a pivot point 272.

The head body 262 is affixed on a coring body 264 with a retaining ring 266. The coring body 264 couples to the drive shaft 224 using a drive tang and threaded collar 268. A ring 257 of the actuator 240 couples to the draw bar 250 with a nut and stud arrangement 255.

As the draw bar 250 is drawn back in the shaft 224 during activation, the ring 257 of the actuator 240 is pulled back against the at least one pivotable blade 270, causing the blade 270 to pivot outward on its pivot point 272 against the inside surface 33 of the housing 32. As shown, the front edge 274 of the blade 270 can define an angle, such as 45-deg, to provide the desired end contour of the rubber stator material 34 being cutback. The top end 278 of the blade 270 can be flat as shown to engage inside the surface 33 of the housing 32.

Similar to those arrangements previously described, the one or more blades 270 can be angled on the head 260 relative to the axis of rotation. Multiple ones of the blades 270 can be pivotable, or one or more may be fixed on head 260. Additionally, the apparatus 200 can rotate the head 260 at a rotational speed and move the head 260 at a traverse speed that is coordinated to produce the desired cutback. Moreover, the actuator 240 can adjust the pivot of the at least one first blade 270 with a force that can be coordinated with these other operations by altering the spring force or the force from the fluid (hydraulic or pneumatic) pressure.

Figure 12:
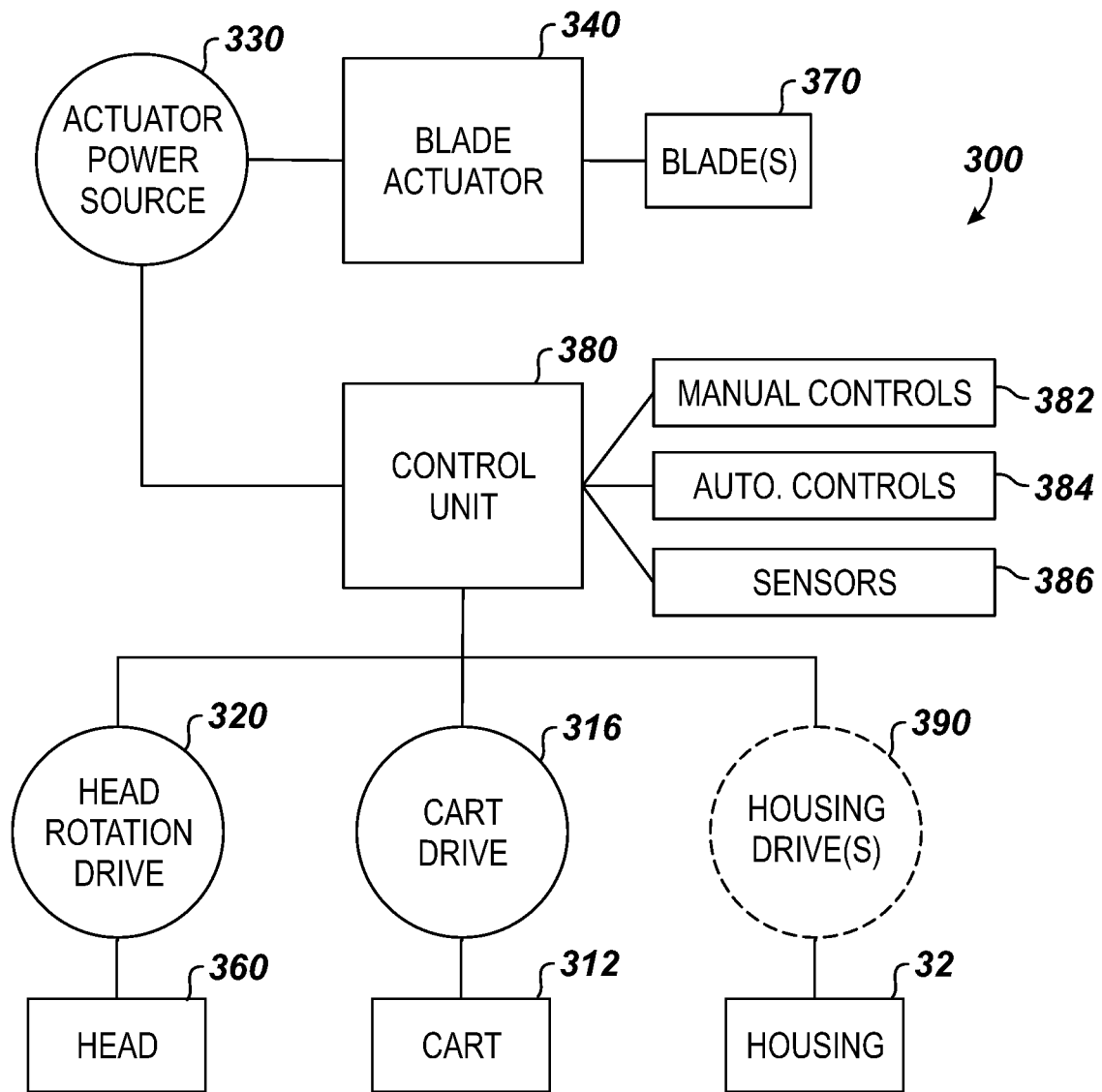
FIG. 12 illustrates a schematic of operational components of the disclosed apparatus.

With an understanding of the disclosed apparatus 100/200, discussion turns briefly to operational components of an embodiment of the disclosed apparatus 300, as schematically shown in FIG. 12. The apparatus 300 includes a control unit 380 operatively coupled to the various drives and power sources of the apparatus 300, including the first drive 320 for rotating the head 360, the second drive 316 for traversing the head 360 (i.e., moving the cart 312), and the power source 330 (e.g., the pneumatic or hydraulic source) for powering the blade actuator 340. If the housing 32 is to be rotated or moved during the process, the control unit 380 can be operatively coupled to one or more drives 390 for rotating and/or moving the housing 32.

The control unit 380 can be a computer or process known in the art. The control unit 380 is operable with inputs from manual controls 382 and/or automatic controls 384. As already noted, the apparatus 300 can coordinate the operation of the drives 320, 316, 390 and the power source 330 to achieve the desired coring depending on the characteristics of the rubber material (34) to be removed, such as its thickness, hardness, and the like. Thus, some of the inputs for the controls 382, 384 can include information about the geometry of the rubber material (34), geometry of the housing 32, hardness of the rubber material (34), number of blades 370 on the head 360, number of pivotable blades on the head 360, angle of the blades 370 on the head 360, etc. Internal algorithms, tables, or other data within the control unit 380 then calculate various operational parameters, such as rotational speed for the head 360, traverse speed of the cart 312, rotational speed of the housing 32, traverse speed of the housing 32, force from the actuator power source 330, pivot of the pivotable blades 370, etc., to be used.

During operations, the control unit 380 can then implement the determined operational parameters. Additionally, the control unit 380 may use sensors 386 to detect movements of the various components and automate operations. Such sensors 386 can include pressure sensors for the power source 330, torque sensors for the drives 320, 316, 390, accelerometers, proximity sensors, optical sensors, etc. Inputs from these and other such sensors 386 can be used by the control unit 380 to adjust the operational parameters during operations.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An apparatus for removing rubber stator material from inside a housing, the apparatus comprising:
   a head being passable at least partially inside the housing along a longitudinal axis;
   at least one drive configured to concurrently impart rotation about the longitudinal axis and translation along the longitudinal axis between the head and the housing;
   at least one blade pivotably connected at a pivot point to the head, the at least one blade being pivotable about the pivot point at a plurality of pivot positions relative to the longitudinal axis and being configured to remove the rubber stator material at least partially from inside the housing along the longitudinal axis in response to the concurrently imparted rotation and translation; and
   an actuator associated with the at least one blade and being configured to adjust the at least one blade to any one of the pivot positions relative to the longitudinal axis.

2. The apparatus of claim 1, wherein the at least one drive comprises a first drive coupled to the head by a shaft and configured to impart the rotation to the head in a first rotational direction about the longitudinal axis.

3. The apparatus of claim 2, further comprising a second drive disposed on a track and configured to translate at least one of (i) the housing and (ii) the first drive, the shaft and the head in a longitudinal direction along the longitudinal axis.

4. The apparatus of claim 3, wherein the second drive is configured to pull and/or pull the head in the longitudinal direction through the housing.

5. The apparatus of claim 2, wherein the at least one drive comprises a second drive coupled to the housing and being configured to impart the rotation to the housing in a second rotational direction, opposite to the first rotational direction, about the longitudinal axis.

6. The apparatus of claim 1, wherein the actuator comprises a piston having a shoulder disposed on the head, the shoulder being movable against the at least one blade.

7. The apparatus of claim 6, wherein the actuator comprises a source disposed in fluid communication with the piston and supplying fluid pressure to the piston, wherein the shoulder is movable against the at least one blade in response to the fluid pressure supplied from the source to the piston.

8. The apparatus of claim 7, comprising a shaft on which the head is disposed, the shaft communicating the fluid pressure from the source to a pressure chamber of the piston disposed on the head.

9. The apparatus of claim 7, comprising a shaft on which the head is disposed, the shaft communicating the fluid pressure from the source to a pressure chamber of the piston disposed on the shaft.

10. The apparatus of claim 6, wherein the piston comprises a biasing element disposed on the head against the shoulder.

11. The apparatus of claim 6, wherein the piston comprises a spring disposed on the head against the shoulder.

12. The apparatus of claim 1, comprising a control unit operably coupled to the at least one drive and the actuator, the control unit coordinating a rotational speed for the imparted rotation, a traverse speed for the imparted translation along the longitudinal axis, and an angle for the adjusted pivot position of the at least one blade.

13. An apparatus for removing rubber stator material from inside a housing, the apparatus comprising:
- at least one drive configured to impart rotation about a longitudinal axis;
- a head being passable at least partially inside the housing along the longitudinal axis of the imparted rotation;
- at least one blade pivotably connected at a pivot point to the head, the at least one blade being pivotable about the pivot point at a plurality of pivot positions relative to the longitudinal axis and being configured to remove the rubber stator material at least partially from inside the housing along the longitudinal axis of the imparted rotation; and
- an actuator associated with the at least one blade and being configured to adjust the at least one blade to any one of the pivot positions relative to the longitudinal axis, the actuator comprising:
  - a piston having a shoulder disposed on the head, the shoulder being movable against the at least one blade;
  - a source disposed in fluid communication with the piston and supplying fluid pressure to the piston; and
  - a shaft on which the head is disposed, the shaft communicating the fluid pressure from the source to a pressure chamber of the piston disposed on the shaft, wherein the shoulder is movable against the at least one blade in response to the fluid pressure supplied from the source to the piston.

14. The apparatus of claim 13, wherein the at least one drive comprises a first drive coupled to the head by a shaft and configured to impart the rotation to the head in a first rotational direction about the longitudinal axis.

15. The apparatus of claim 14, further comprising a second drive disposed on a track and configured to translate at least one of (i) the housing and (ii) the first drive, the shaft and the head in a longitudinal direction along the longitudinal axis.

16. The apparatus of claim 15, wherein the second drive is configured to pull and/or pull the head in the longitudinal direction through the housing.

17. The apparatus of claim 14, wherein the at least one drive comprises a second drive coupled to the housing and being configured to impart the rotation to the housing in a second rotational direction, opposite to the first rotational direction, about the longitudinal axis.

18. The apparatus of claim 13, wherein the piston comprises a biasing element disposed on the head against the shoulder.

19. The apparatus of claim 13, comprising a control unit operably coupled to the at least one drive and the actuator, the control unit coordinating a rotational speed for the imparted rotation, a traverse speed for the passage along the longitudinal axis, and an angle for the adjusted pivot position of the at least one blade.

* * * * *